(12) United States Patent
Prokhorov

(10) Patent No.: US 7,392,696 B1
(45) Date of Patent: Jul. 1, 2008

(54) SENSORLESS TIRE PRESSURE ESTIMATING METHOD FOR VEHICLE WITH ABS BRAKE CONTROL

(75) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/733,324

(22) Filed: Apr. 10, 2007

(51) Int. Cl.
 *G01M 17/02* (2006.01)
 *G01C 21/00* (2006.01)
(52) U.S. Cl. ........................................ 73/146; 701/300
(58) Field of Classification Search .................. 73/146; 701/300
See application file for complete search history.

(56) References Cited

U.S. PATENT DOCUMENTS

| 6,644,105 | B2 | 11/2003 | Dieckmann et al. |
| 2003/0172728 | A1 | 9/2003 | Gustafsson et al. |
| 2005/0030170 | A1 | 2/2005 | Rieck et al. |
| 2007/0219720 | A1* | 9/2007 | Trepagnier et al. .......... 701/300 |

* cited by examiner

*Primary Examiner*—Andre J Allen
(74) *Attorney, Agent, or Firm*—Gifford, Krass, Sprinkle, Anderson & Citkowski, P.C.

(57) ABSTRACT

Variations in pressure of a pneumatic tire on a vehicle with an anti-lock braking system (ABS) are estimated, without using additional instrumentation, by determining a spring constant K for the wheel while it is in rolling motion by determining angular velocity of the wheel, and then processing timestamp data for the wheel according to a derivative-free formulation of a nonlinear Kalman filter to estimate a spring constant K for the wheel and using variations in the spring constant K to estimate variations in pressure of the tire.

7 Claims, 3 Drawing Sheets

SENSORLESS TIRE PRESSURE ESTIMATING METHOD FOR VEHICLE WITH ABS BRAKE CONTROL

FIELD OF THE INVENTION

This invention relates to a sensorless method of estimating tire pressure of a pneumatic tire of a motor vehicle that is equipped with an ABS (anti-lock braking system).

BACKGROUND OF THE INVENTION

For various reasons, including reasons relating to vehicle safety and fuel economy, it is important to be able to determine the pressure of each pneumatic tire of a motor vehicle, and, if possible, to be able to do so on a continuous basis. For most containment reasons, it is also important to be able to do so without the need to incorporate additional instrumentation for that purpose. In vehicles incorporating an ABS system, a pulse signal from the ABS system can be used to determine the rotational speed or angular velocity of each wheel. Published U.S. patent application Ser. No. 2003/0172728 A1 (Gustafson et al.) discloses a system for using the angular velocity of the wheels of a vehicle, and parameters indicative of lateral movement of the vehicle, to estimate vehicle tire pressure. The need to use vehicle lateral dynamics in determining vehicle tire pressure does, however, require a gyro to sense the yaw rate of the vehicle, and this is an item of expense that, desirably, is to be eliminated whenever possible.

SUMMARY OF THE INVENTION

A tire pressure estimating method according to the present invention uses a sequence of timestamps, or the time intervals between successive timestamps, from a standard vehicle encoder that is associated with each wheel of a vehicle with an anti-lock braking system (ABS). The method uses the known spring damper model with derivative-free formulation of nonlinear Kalman filters to process timestamp data to thereby achieve accurate estimation of the spring constant K of the tire model, and thereby tire pressure variations from changes in the estimates of K. A nonlinear generalization of the Kalman filter is described in M. Nøgaard, N. K. Poulsen, O. Ravn, "Advances in Derivative-Free State Estimation for Nonlinear Systems" Technical Report IMM-REP-1998-15 (revised edition), Technical University of Denmark, 2000, the disclosure of which is incorporated by reference herein. This technique is hereinafter described as the nprKFj ("j" denotes joint estimation).

DETAILED DESCRIPTION OF THE INVENTION

Figure 1:
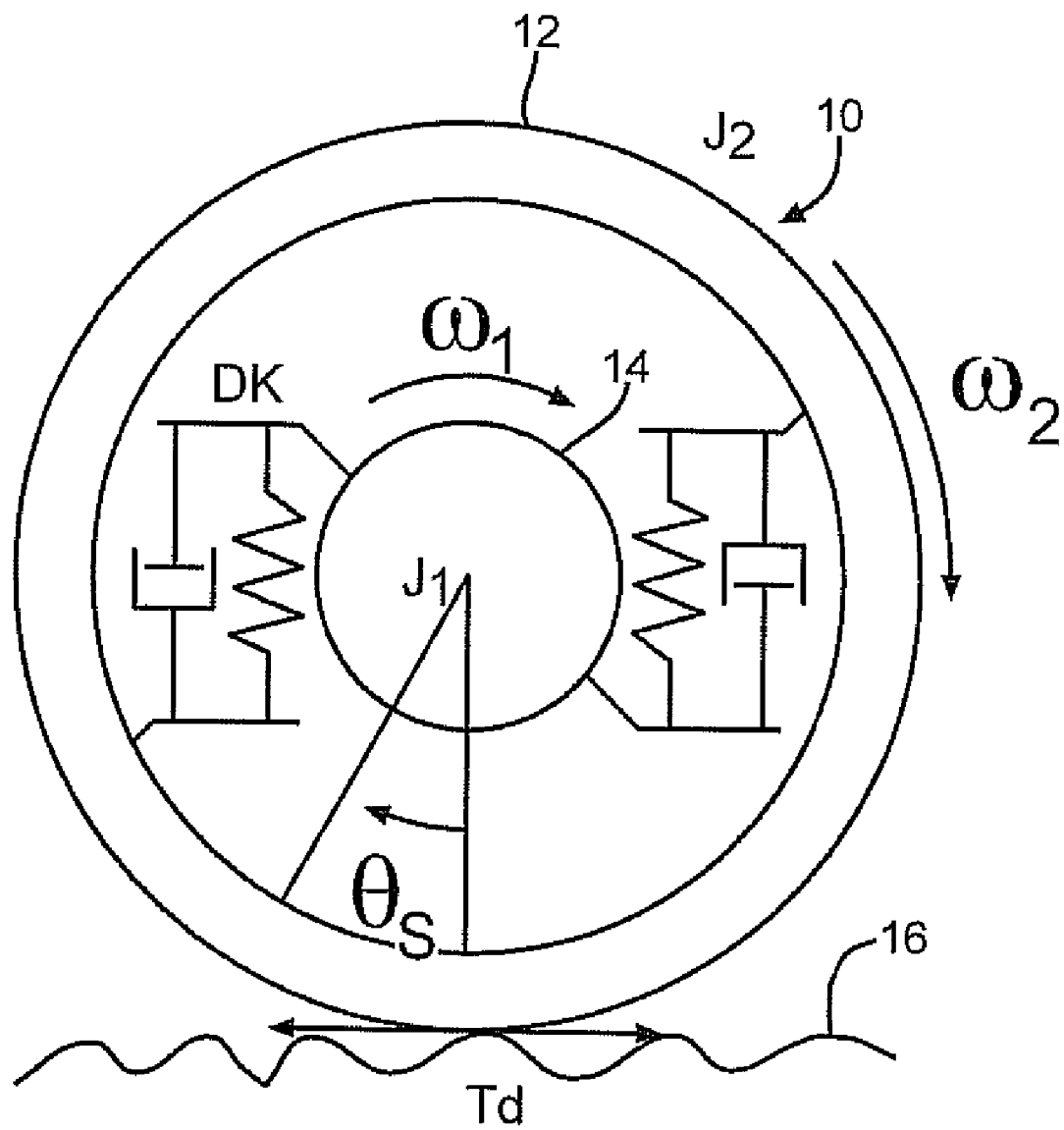
FIG. 1 is a schematic view of a tire with the various factors that are effected by the rolling movement of the tire along a surface.

FIG. 1 illustrates a rolling wheel, indicated generally by reference numeral 10, which has a belt side 12 with a moment of inertia $J_2$ and a rim side 14 with a moment of inertia $J_1$. The wheel 10 is shown as rolling in a clockwise direction along an irregular surface 16, such as a road, which may have a disturbance $T_d$ therein. The equations that describe the torsional vibration of the wheel 10 as it rolls along a surface 16 can be written as follows:

$$\begin{bmatrix} \dot{\omega}_1 \\ \dot{\omega}_2 \\ \dot{\theta}_s \end{bmatrix} = \begin{bmatrix} -\frac{D}{J_1} & \frac{D}{J_1} & -\frac{K}{J_1} \\ \frac{D}{J_2} & -\frac{D}{J_2} & \frac{K}{J_2} \\ 1 & -1 & 0 \end{bmatrix} \begin{bmatrix} \omega_1 \\ \omega_2 \\ \theta_s \end{bmatrix} + \begin{bmatrix} 0 \\ -\frac{1}{J_2} \\ 0 \end{bmatrix} T_d$$

Given values for $J_1$ and $J_2$, moments of inertia at the rim side and at the belt side, respectively, the general idea is to estimate the disturbance $T_d$, the states $\omega_1$ (speed of rotation of the rim), $\omega_2$ (speed of rotation of the belt) and $\theta_s$ (torsional angle), as well as the parameters D and K. The parameter D is called the damping constant, and the parameter K is called the spring constant. The torsional angle $\theta_s$ is given by $$\theta_s = \theta_1 - \theta_2$$

where $\theta_1$ is the rotational angle of the rim and $\theta_2$ is the angle of the belt. Although these continuous-time equations are linear, when discretized over finite intervals they become nonlinear in the parameters D and K.

According to the present invention, then, changes in the pressure of a pneumatic tire on the wheel 10 can be estimated with a sufficient degree of accuracy from estimates of K without measuring or sensing any variable other than the time interval t required for the wheel 10 for the rim side 14 to rotate through a specified time interval.

When using the information provided by the ABS system one is measuring a sequence of timestamps, that is, a sequence of increasing time values that correspond to the passage of particular positions on an encoder wheel past a sensing device. The difference between successive timestamps is the time required for rotation through a known angular interval. Such angular intervals, hereinafter referred to as tooth intervals, tend to be approximately uniform, though small differences usually exist and cannot be ignored. We assume the existence of a means of estimating accurately each tooth interval on the encoder wheel. In addition, some means of establishing a reference angular position on the encoder is usually employed. For example, a missing tooth creates one interval larger than the rest. As will be seen, however, the nonuniform angular intervals pose no particular difficulty for the method of the present invention.

The method of the present invention denotes the number of state variables and the number of outputs such as L and M, respectively. The model has only one output, we have M=1. The state vector x has L=seven elements. The square root of the L×L covariance matrix T is also L×L, and is denoted by $\bar{S}_k$ and $\hat{S}_x$ following the a priori and a posteriori updates, respectively.

In detail, the evolution of the state variables is taken to be $$\omega_1(t_k + \delta t) = \omega_1(t_k) + \delta t \left( -\frac{D(t_k)}{J_1} \omega_1(t_k) + \frac{D(t_k)}{J_1} \omega_2(t_k) - \frac{K(t_k)}{J_1} \theta_s(t_k) \right)$$

$$\omega_2(t_k + \delta t) = \omega_2(t_k) + \delta t \left( \frac{D(t_k)}{J_2} \omega_1(t_k) - \frac{D(t_k)}{J_2} \omega_2(t_k) + \frac{K(t_k)}{J_2} \theta_s(t_k) - \frac{T_d(t_k)}{J_2} \right)$$

$\theta_s(t_k+\delta t)=\theta_s(t_k)+\delta t(\omega_1(t_k)-\omega_2(t_k))$ $\phi(t_k+\delta t)=\phi(t_k)+\delta t\omega_1(t_k)$ $D(t_k+\delta t)=D(t_k)$ $K(t_k+\delta t)=K(t_k)$ $T_d(t_k+\delta t)=T_d(t_k)$ where $$\delta t = \frac{t_{k+1} - t_k}{N}$$

is the discretization subinterval and N is the number of such subintervals. It is easy to see that iterating these equations N times accomplishes the model transition from $t_k$ to $t_{k+1}$. Note that, prior to this iteration, we initialize $\phi(t_k)$ to zero.

The formula set forth in paragraph [0007] is discretized under the assumption that the road disturbance $T_d$ does not change more often that once each tooth interval. The road disturbance may be modeled as zero-mean random noise, or a filtered version thereof. It is reasonably assumed that the parameters D and K change much more slowly than the states. It is also assumed that values for the moments of inertia $J_1$ and $J_2$ are reasonably well known and do not change.

As a practical matter, it is noted that the underlying goal it to estimate tire pressure, rather than to estimate states, parameters, and disturbances. Consequently, the limited goal of estimating the spring constant K and possibly the damping D sufficiently well to provide an accurate mapping to tire pressure is adopted. In model studies, the measure of success is how well the estimation $\hat{K}$ can be mapped to the model K, in spite of variations in the model damping constant, changes in the disturbance pattern, and errors in the estimates of quantities other than K.

The basis for the NPR generalization of the Kalman filter is the replacement of a Taylor expansion in the vicinity of the current state vector with an expansion based on Stirling's formula for approximating a function over an interval. The advantage over EKF is a more accurate estimate of the evolution of a Gaussian distribution under nonlinear transformation. This is done by reconstructing the evolved covariance matrix from text vectors, derived from the square root of the covariance matrix and subject to the same transformation.

$\phi$, $\omega_1$, $\omega_2$, $\theta_s$, the disturbance $T_d$, and the parameters D and K are treated as state variables to be estimated. Note that the rotation $\phi$ of the rim over a chosen time interval is added to the traditional list of state variables, and is treated as the output of the system. For each time interval, the two parts of the Kalman recursion, viz., the a priori (time) update and the a posteriori (measurement) update are carried out. In the a priori update, mean values for the evolving state variables for the next time step, based on the values at the current time step and the model dynamics, are determined. An estimate of the covariance matrix, given the dynamics, is evaluated in the a posteriori step, the difference between the estimate $\phi(t_{k+1})$ of the mean output and the actual angular rotation drives updates of the state vector and the covariance matrix.

The formula set forth above is consulted for background and theoretical justification. Using the discrete time space-space notation, the model can then be written as $x(t_{k+1})=f(x(t_k))+v(t_k)$ $y(t_{k+1})=\phi(t_{k+1})+w(t_{k+1})$ where the column vector $x(t)=[\omega_1(t), \omega_2(t), \theta_s(t), \phi(t), D(t), K(t), T_d(t)]^T$.

The function f denotes the vector function describing the model evolution from $t_k$ to $t_{k+1}$, v is the process noise, y is the measured angular interval and w is the measurement noise. Only $\omega_1(t)$, $\omega_2(t)$, $\theta_s(t)$ and $\phi$ evolve over time. The components of t for D, K and $T_d$ are equal to the identity transformation.

In joint npt KF, we distinguish between the estimates of various quantities that result from the a priori and a posteriori updates. For example, following the a priori update, the state vector estimate is denoted as $\overline{x}$ and following the a posteriori update as $\overline{\overline{x}}$.

To gain experience with a proposed method, numerous studies with data simulated by the above model have been carried out.

Model parameters and measurement values were chosen to be representative of the available experimental data. For convenience, the tooth time intervals were chosen to be constant: $\tau=9.125\times10^{-4}$ s. The model was evolved according to the discrete-time equations. Subintervals were required to exceed $1\times10^{-4}$ s, leading here to N=10 and $\delta t=9.125\times10^{-5} s$ The nominal model parameters were chosen as follows:

$J_1=0.3$ kg·m$^2$, $J_2$1.36 kg·m$^2$, $D_{nom}=15$ N·m·s $K_{nom}=20\ 400$ N·m·rad$^{-1}$ The values of $D_{nom}$ and $K_{nom}$ correspond to the nominally inflated tire. The model equations for computational reasons were modified to accommodate the scaled values $D_{nom}=1.5$ and $K_{nom}=2.04$.

Figure 2:
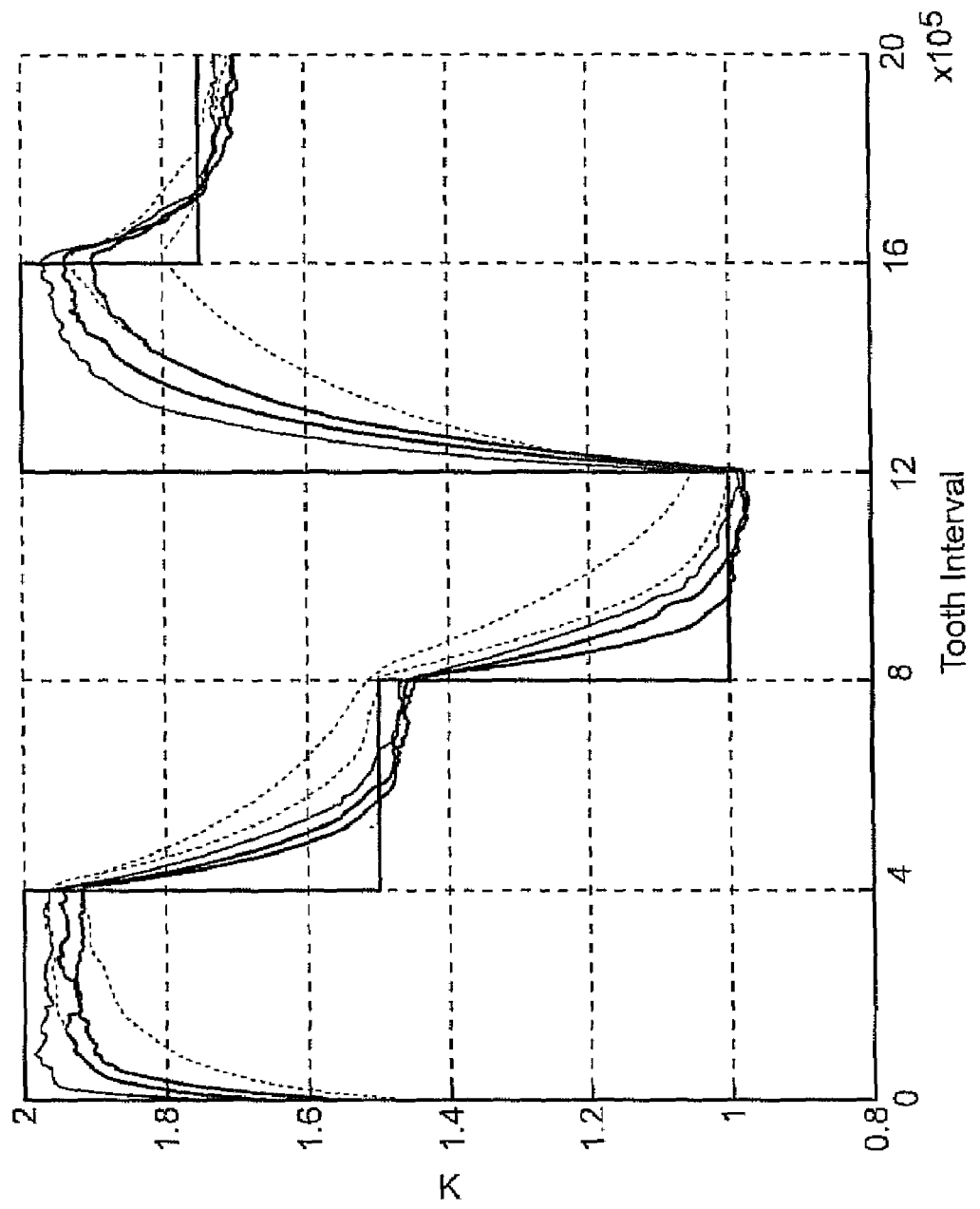
FIG. 2 is a graph that illustrates the estimated tire spring constant K versus actual spring constants at various tire angular velocities, as measured at various levels of tooth interval.

FIG. 2 illustrates convergence plots for $\hat{K}$. The model value of K is changed every 400,000 intervals. Solid curves represent D=1.0, 1.5, and 2.0; slower convergence corresponds to a higher value of D. The two dashed curves correspond to D=1.0 and 2.0, but with the disturbance probability reduced to 0.25 from 1.0.

Various working matrices must be set up before executing the nprKFj recursion. The matrices $S_{x\hat{x}}^{(1)}$ and $S_{x\hat{x}}^{(2)}$ are computed from $(S_{x\hat{x}}^{(1)})_{ij} = \frac{1}{2h}(f_i(\hat{x}+h\hat{s}_{xj}) - f_i(\hat{x}-h\hat{s}_{xj}))$ and $(S_{x\hat{x}}^{(2)})_{ij} = \frac{(h^2-1)^{\frac{1}{2}}}{2h^2}(f_i(\hat{x}+h\hat{s}_{\hat{x}j}) + f_i(\hat{x}-h\hat{s}_{\hat{x}j}) - 2f_i(\hat{x}))$ Here i indexes the state variables and j indexes the columns of the matrix $\hat{S}_x$. The quantity $f_i(\hat{x}+h\hat{s}_{sj})$ represents the i$^{th}$ state variable at time $t_{k+1}$ after the states are instantiated with state vector $\hat{x}+h\hat{s}_{xj}$ at time $t_k$ and the model is executed from $t_k$ to $t_{k+1}$. The model must be executed over this interval $2L+1$ times, i.e., for the central value $\hat{x}$ of the state vector and for each of its $2L$ variations. In return, it is not required to compute any derivatives. Note that this procedure does not amount merely to numerical differentiation.

Following the formula set forth in paragraph [0007] the $M \times (L+M+L)$ concatenated matrix is defined as $$S_y = [S_{y\bar{x}}^{(1)} S_{yw}^{(1)} S_{y\bar{x}}^{(2)}]$$

and is reduced to lower triangular form, and the matrix is computed as $$P_{xy} = \bar{S}_x S_{y\bar{x}}^{(1)T}$$

and the Kalman gain matrix K is then solved as $$KS_y S_y^T = P_{xy}$$

and the square root of the covariance matrix is updated by triangularizing the $L \times (L+M+L)$ matrix as $$\hat{S}_x = [\bar{S}_x - KS_{y\bar{x}}^{(1)} KS_{yw}^{(1)} KS_{y\bar{x}}^{(2)}]$$

In general, weighted-sum outputs are computed according to $$\bar{y}_i = \frac{h^2 - L}{h^2} g_i(\bar{x}) + \frac{1}{2h^2} \sum_{j=1}^{L} [g_i(\bar{x} + h\bar{s}_{\bar{x}j}) + g_i(\bar{x} - h\bar{s}_{\bar{x}j})]$$

and are used in the state update:

$$\hat{x} = \bar{x} + K(y - \bar{y})$$

In this application, because there is only one output and it is identically equal to one of the states, we have $$\bar{y} = \hat{\phi} = \bar{\phi}$$

and $$\hat{x} = \bar{x} + K(\phi - \hat{\phi})$$

The state estimate for step $k+1$ is given by the following weighted sum:

$$\bar{x}_i = \frac{h^2 - L}{h^2} f_i(\hat{x}) + \frac{1}{2h^2} \sum_{j=1}^{L} [f_i(\hat{x} + h\hat{s}_{\hat{x}j}) + f_i(\hat{x} - h\hat{s}_{\hat{x}j})]$$

A characteristic of the NPR formation is that the state estimate for step $k+1$ is not merely the previous estimate evolved to the next step, i.e., $f(\hat{x}(t_k))$.

The revised estimate for the square root of the covariance matrix is obtained by forming the $L \times 3L$ concatenated matrix $$\bar{S}_x = [S_{x\hat{x}}^{(1)} S_{x\hat{x}}^{(2)} S_{xv}^{(1)}]$$

reducing it to lower triangular form, and retaining only the leftmost $L \times L$ part.

When the state variable i corresponds to D, K or $T_d$, $f_i(\hat{x} + h\hat{s}_{\bar{x}j}) = (\hat{x} + h\hat{s}_{\bar{s}j})_i$, since these quantities do not evolve. This implies from the equation above for $\bar{x}_1$ that $\bar{x}_1 = \hat{x}_i$ for D, K and $T_d$.

Again some working matrices are needed. In general, the $ij^{th}$ elements of the $M \times L$ matrices $$S_{y\bar{x}}^{(1)} \text{ and } S_{y\bar{x}}^{(2)}$$

are given by $$(S_{y\bar{x}}^{(1)})_{ij} = \frac{1}{2h}(g_i(\bar{x} + h\bar{s}_{\bar{x}j}) - g_i(\bar{x} - h\bar{s}_{\bar{x}j}))$$

and $$(S_{y\bar{x}}^{(2)})_{ij} = \frac{(h^2-1)^{\frac{1}{2}}}{2h^2}(g_i(\bar{x} + h\bar{s}_{\bar{x}j}) + g_i(\bar{x} - h\bar{s}_{\bar{x}j}) - 2g_i(\bar{x}))$$

where g represents the transformation between states and outputs. In the present application, we have only one output which is itself the state variable $\phi$; hence $g(\bar{x}) = \bar{\phi}$. This also implies that $$S_{y\bar{x}}^{(2)} = 0.$$

The probability of imposing a disturbance was randomly selected from the range [0.25, 1.0], and the maximum disturbance amplitude $T_d^{max}$ was selected from the scaled range [0.125, 0.375]. During each time interval, a disturbance $T_d$ was applied or not, according to the selected probability; if applied, the amplitude was selected from $[-T_d^{max}, T_d^{max}]$. In all runs, the initial estimates were $\hat{K}(0)=1.5$ and $\hat{D}(0)=1.5$.

Figure 3:
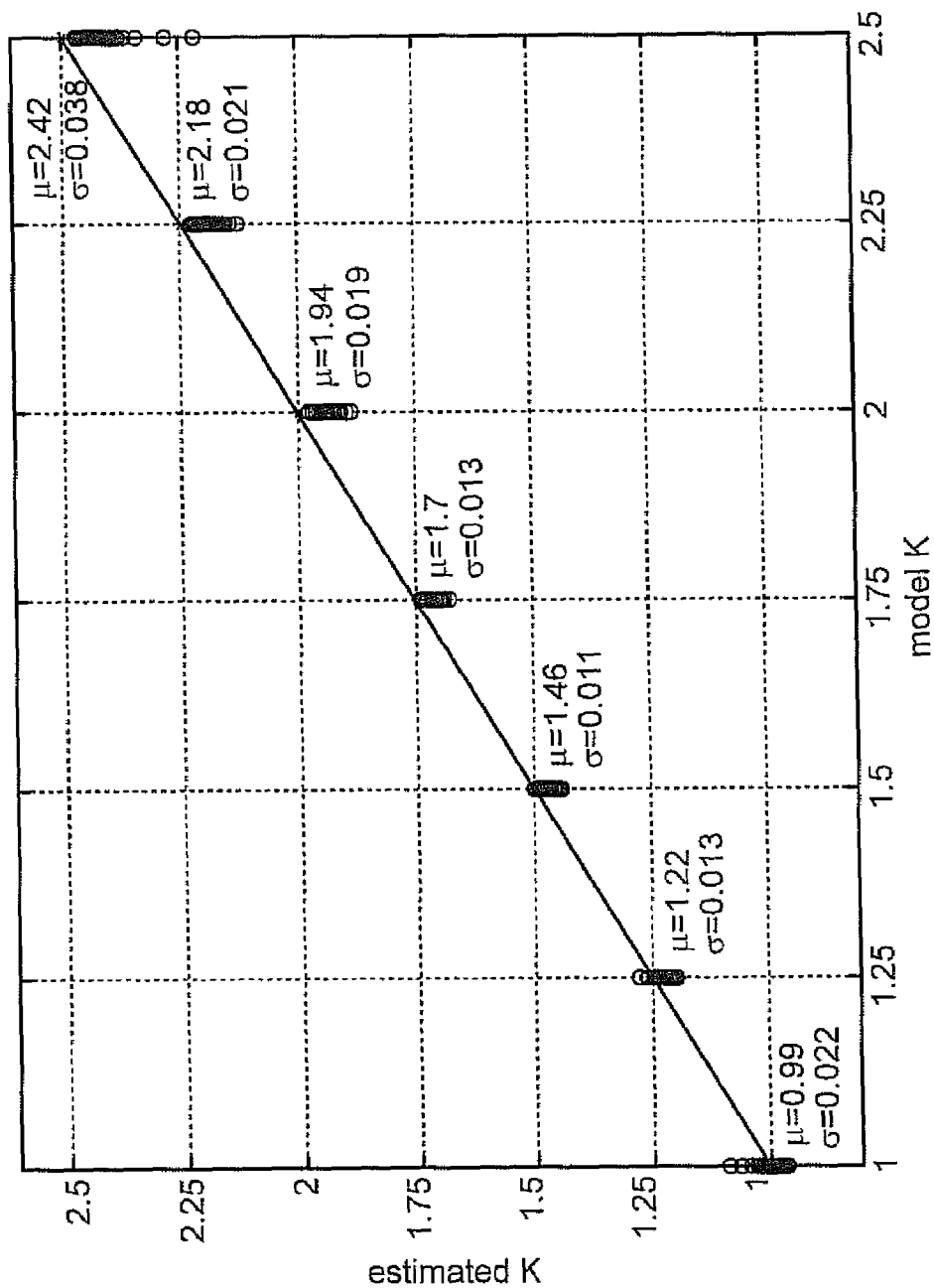
FIG. 3 is a graph showing estimated spring constants using the present invention versus the model spring constant for a given tire.

An additional minor source of variation was included in the results of FIG. 3. The time intervals were allowed to vary slightly from the constant value $\tau=9.125 \times 10^{-4}$s by addition of a random value in the range $[-2.5 \times 10^{-7}, 2.5 \times 10^{-7}]$.

The actual and estimated values of K correlate quite well. The mapping is almost linear, with slope slightly less than 1.0. The points corresponding to fixed values of model K have overall spreads usually less than 0.1 units; standard deviations range from 0.011 to 0.038. Thus, if this were real data, it would be possible to infer K with an accuracy of better than 0.1 units (1000 N·m·rad$^{-1}$).

FIG. 3 is a plot of estimated K vs. model K for variations in model damping D, disturbance amplitude and probability, and initial values of rim and belt speeds $\omega_1$ and $\omega_2$.

In normal operation, the estimated K for each wheel of a multi-wheel vehicle will be approximately equal to the estimated K for each other wheel. When the estimated K for any wheel drops significantly below that of the other wheels, or below a user-defined threshold, this is an indication of a loss of pressure in that wheel, and a signal that such wheel should be repressurized or checked for a continuous leak of pressurized air. This information can be conveyed to the operator of the vehicle, for example, by energizing a light for that wheel on the dashboard of the vehicle in the way that a door open condition is indicated by energizing a light for that door.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims.

The invention claimed is:

1. An otherwise sensorless method of estimating tire pressure in a pneumatic tire on a wheel of a vehicle equipped with an anti-lock braking system (ABS) comprising:
using timestamp data from the ABS system to determine angular velocity of the wheel;
processing timestamp data for the wheel using derivative-free formulation of nonlinear Kalman filters to estimate a spring constant K of a model of the tire; and
inferring pressure variations from changes in estimates of the spring constant K.

2. A method according to claim 1 wherein:
derivative-free formulation of nonlinear Kalman filter is based on the evaluation of the state variables, as follows:

$$\omega_1(t_k + \delta t) = \omega_1(t_k) + \delta t\left(-\frac{D(t_k)}{J_1}\omega_1(t_k) + \frac{D(t_k)}{J_1}\omega_2(t_k) - \frac{K(t_k)}{J_1}\theta_s(t_k)\right)$$

$$\omega_2(t_k + \delta t) = \omega_2(t_k) + \delta t\left(\frac{D(t_k)}{J_2}\omega_1(t_k) - \frac{D(t_k)}{J_2}\omega_2(t_k) + \frac{K(t_k)}{J_2}\theta_s(t_k) - \frac{T_d(t_k)}{J_2}\right)$$

$$\theta_s(t_k+\delta t)=\theta_s(t_k)+\delta t(\omega_1(t_k)-\omega_2(t_k))$$

$$\phi(t_k+\delta t)=\phi(t_k)+\delta t\omega_1(t_k)$$

$$D(t_k+\delta t)=D(t_k)$$

$$K(t_k+\delta t)=K(t_k)$$

$$T_d(t_k+\delta t)=T_d(t_k)$$

where $$\delta t = \frac{t_{k+1} - t_k}{N}$$

is the discretization subinterval and N is the number of such subintervals.

3. A method according to claim 2 wherein:
in iterating the method of claim 2 N times, the model transition from $t_k$ to $t_{k+1}$ is accomplished after $\phi(t_k)$ is initialized to zero.

4. A method according to claim 2 wherein:
$\phi$, $\omega_1$, $\omega_2$, $\theta_s$, the disturbance $T_d$, and the parameters D and K are treated as state variables to be estimated, and the rotation $\phi$ of the rim over a chosen time interval is added to the traditional list of state variables, and is treated as the output of the system.

5. A method according to claim 4 wherein:
for each time interval, the two parts of the Kalman recursion, the a priori (time) update and the a posteriori (measurement) are carried out.

6. A method according to claim 5 wherein:
mean values for the evolving state variables for the next step, based on the values at the current time step and the model dynamics, are determined in the a priori update.

7. A method according to claim 5 wherein:
an estimate of the covariance matrix, based on the dynamics, is evaluated in the a posteriori step and the difference between the estimate ($\phi(t_{k+1})$) of the mean output and the angular rotation drives of the state vector and the covariance matrix.

* * * * *

UNITED STATES PATENT AND TRADEMARK OFFICE
CERTIFICATE OF CORRECTION

PATENT NO. : 7,392,696 B1
APPLICATION NO. : 11/733324
DATED : July 1, 2008
INVENTOR(S) : Danil V. Prokhorov It is certified that error appears in the above-identified patent and that said Letters Patent is hereby corrected as shown below:

Column 1, line 17 replace "most" with --cost--
Column 1, line 33 replace "Nogaard" with --Norgaard--
Column 3, line 23 replace "that" with --than--
Column 3, line 29 replace "goal it" with --goal is--
Column 3, line 63 replace "space" with --state--
Column 4, line 10 replace "npt" with --npr--
Column 5, line 63 replace "formation" with --formulation--

Signed and Sealed this

Twenty-third Day of September, 2008

JON W. DUDAS
*Director of the United States Patent and Trademark Office*

UNITED STATES PATENT AND TRADEMARK OFFICE
Certificate

Patent No. 7,392,696 B1                                                                           Patented: July 1, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Danil V. Prokhorov, Canton, MI (US); Lee A. Feldkamp, Plymouth, MI (US); and Timothy M. Feldkamp, Ann Arbor, MI (US).

Signed and Sealed this Nineteenth Day of November 2013.

<div style="text-align:right">

LISA CAPUTO
*Supervisory Patent Examiner*
Art Unit 2856
Technology Center 2800

</div>